US012071246B2

United States Patent
Pearson et al.

(10) Patent No.: US 12,071,246 B2
(45) Date of Patent: Aug. 27, 2024

(54) AIR FLOW MANAGEMENT

(71) Applicant: B/E Aerospace, Inc., Winston Salem, NC (US)

(72) Inventors: Matthew Robert Pearson, Hartford, CT (US); Brian St. Rock, Andover, CT (US); Abbas A. Alahyari, Glastonbury, CT (US); Yasmin Khakpour, East Hartford, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 325 days.

(21) Appl. No.: 17/481,106

(22) Filed: Sep. 21, 2021

(65) Prior Publication Data

US 2022/0089289 A1     Mar. 24, 2022

Related U.S. Application Data

(60) Provisional application No. 63/080,997, filed on Sep. 21, 2020.

(51) Int. Cl.
    *B64D 13/06*          (2006.01)
(52) U.S. Cl.
    CPC ...... *B64D 13/06* (2013.01); *B64D 2013/0651* (2013.01); *B64D 2013/0688* (2013.01)
(58) Field of Classification Search
    None
    See application file for complete search history.

(56) References Cited

U.S. PATENT DOCUMENTS

| | | | | |
|---|---|---|---|---|
| 4,742,760 A | * | 5/1988 | Horstman | B64D 13/00 454/76 |
| 4,819,548 A | * | 4/1989 | Horstman | B64D 13/00 454/76 |
| 6,491,254 B1 | * | 12/2002 | Walkinshaw | B64D 13/00 244/119 |
| 9,623,973 B2 | * | 4/2017 | Al-Ali | B64D 13/08 |

(Continued)

FOREIGN PATENT DOCUMENTS

| | | |
|---|---|---|
| DE | 3871861 T2 | 12/1992 |
| EP | 3088303 A1 | 11/2016 |

(Continued)

OTHER PUBLICATIONS

Extended European Search Report for European Patent Application No. EP21198129.5, dated Feb. 8, 2022.

(Continued)

*Primary Examiner* — Ko-Wei Lin
(74) *Attorney, Agent, or Firm* — SNELL & WILMER L.L.P.

(57) ABSTRACT

In accordance with at least one aspect of this disclosure, a system includes, an environmental control system (ECS) having a plurality of ducts configured to convey a flow of air into an interior space through the plurality of ducts, a plurality of valves disposed in the plurality of ducts to control the flow of air through a respective duct into the interior space, an overhead bin mounted in the interior space below the plurality of ducts relative to the direction of airflow, and a diffuser disposed at an outlet of the plurality of duct configured to induce the airflow to flow along a convex outer surface of the overhead bin.

16 Claims, 3 Drawing Sheets

(56) References Cited

U.S. PATENT DOCUMENTS

| | | | | |
|---|---|---|---|---|
| 2007/0164158 A1* | 7/2007 | Buchholz | ............... | B64C 1/18 |
| | | | | 244/119 |
| 2008/0099606 A1* | 5/2008 | Horstman | ............. | B64D 13/06 |
| | | | | 244/118.5 |
| 2016/0031562 A1* | 2/2016 | Mores | ................. | B64D 13/08 |
| | | | | 244/119 |
| 2016/0318614 A1* | 11/2016 | Bultemeier | ............ | F24F 13/06 |
| 2016/0325839 A1* | 11/2016 | Wang | ................. | B60H 1/3414 |
| 2017/0275012 A1* | 9/2017 | Tretow | ................. | B64D 33/04 |
| 2018/0118351 A1* | 5/2018 | Fox | .................. | G01N 33/0047 |
| 2018/0273187 A1* | 9/2018 | Vinke | ..................... | B64C 1/06 |
| 2019/0283884 A1* | 9/2019 | Horner | ................. | B64D 41/00 |
| 2020/0094971 A1* | 3/2020 | Etchessahar | .......... | B64D 13/06 |
| 2021/0253258 A1* | 8/2021 | Kumagai | .............. | H01H 1/605 |

FOREIGN PATENT DOCUMENTS

| | | |
|---|---|---|
| EP | 3090948 A1 | 11/2016 |
| EP | 3381808 A1 | 10/2018 |
| EP | 3925885 A1 | 12/2021 |

OTHER PUBLICATIONS

Office Action from the European Patent Office for European Patent Application No. EP21198129.5, dated Jul. 17, 2023.

\* cited by examiner

To Atmosphere

AIR FLOW MANAGEMENT

CROSS-REFERENCE TO RELATED APPLICATIONS

This application claims priority to and the benefit of U.S. Provisional Patent Application No. 63/080,997 filed Sep. 21, 2020, the entire content of which is incorporated herein by reference.

BACKGROUND

1. Field

The present disclosure relates to airflow management, and more particularly to airflow management in aircraft cabins.

2. Description of Related Art

Controlling airflow has been shown to aid in the control of contamination spread by air. This contamination could be particulate, droplet, gaseous or other forms of airborne matter. To more precisely control the airflow onboard aircraft, it may be desirable to be able to strategically control the airflow through each vent in an airflow system into an enclosed space.

The conventional techniques have been considered satisfactory for their intended purpose. However, there is an ever present need for improved systems and methods for mitigated spread of airborne pathogens in enclosed environments. This disclosure provides a solution for this need.

SUMMARY

In accordance with at least one aspect of this disclosure, a system includes, an environmental control system (ECS) having a plurality of ducts configured to convey a flow of air into an interior space through the plurality of ducts, a plurality of valves disposed in the plurality of ducts to control the flow of air through a respective duct into the interior space, an overhead bin mounted in the interior space below the plurality of ducts relative to the direction of airflow, and a diffuser disposed at an outlet of the plurality of duct configured to induce the airflow to flow along a convex outer surface of the overhead bin. In certain embodiments, the diffuser can be configured to induce the airflow to flow along a convex outer surface of the overhead bin under the Coandă effect.

In embodiments, each duct can include an inlet that is positioned on a crown of the interior space, and an outflow can be positioned on a floor of the interior space configured to exhaust the airflow. Additionally or alternatively, each duct can include an inlet that is positioned on a window of the interior space, and an outflow can be positioned on a floor of the interior space configured to exhaust the airflow. In embodiments, a majority of air flow from the ECS can flow from the inlet at a top of the interior space, along the overhead bin, to the outflow at a bottom of the interior space. In certain embodiments, the diffuser can be configured to cause at least a portion of the airflow to pass through a single passenger service unit from the overhead bin to the outflow.

In certain embodiments, the system can include an airflow deflector operatively connected to the overhead bin configured to direct at least a portion of the airflow to a single passenger service unit. In certain embodiments, the airflow deflector can include a plurality of airflow deflectors, where each respective airflow deflector is configured to direct a respective portion of the airflow to a single respective passenger service unit.

In certain embodiments, the respective portion of the airflow can be configured to flow through a single passenger service unit from a deflection point on the overhead bin to the outflow. In certain embodiments, the airflow deflector can be formed integral with the overhead bin. In certain embodiments, the airflow deflector can be configured to be mounted to an existing overhead bin. In certain embodiments, the airflow deflector can be or include at least one of a scoop, a bump, and/or a dimple, where the deflector can be included on a strip.

In certain embodiments, the airflow can be exhausted to atmosphere through an outflow valve. In certain embodiments, the airflow can be exhausted to a recirculation module configured to recirculate the airflow to the ECS, wherein the exhausted airflow is passed through an air filter before being recirculated. In certain embodiments, a portion of the airflow can be exhausted to atmosphere, and a portion of the airflow can be exhausted to the recirculation module. In certain embodiments, the air filter can include a HEPA filter.

In accordance with at least one aspect of this disclosure, a system can include means for conveying a flow of air into an interior space through a plurality of ducts and means for directing at least a portion of the flow of air from the plurality of ducts to a single passenger service unit. The respective portion of the flow of air can be configured to flow through the single passenger unit before being exhausted.

In accordance with at least one aspect of this disclosure, a method can include flowing air into an interior space through a plurality of ducts of an environmental control system at a top of the interior space relative to the direction of airflow, directing a portion of the air flow downward relative to gravity to a single passenger service unit of a plurality of passenger service units, flowing the air from the interior space through an outflow at a bottom of the interior space relative to the direction of airflow, and exhausting the air from the interior space to a recirculation module and/or an ambient environment.

In certain embodiments, directing the air flow can include flowing the air through a diffuser at an outlet of the plurality of ducts configured to create a Coandă effect on airflow effused from the plurality of ducts, and flowing at least a portion of the airflow along a convex outer surface of an overhead bin, and downward to the single passenger service unit.

In certain embodiments, directing the air flow can include deflecting the airflow with an airflow deflector operatively connected to an overhead bin to direct at least a portion of the airflow to the single passenger service unit. In certain embodiments, exhausting the air from the interior space to a recirculation module further includes, passing the exhausted air through a HEPA filter, and the method can further include recirculating the exhausted air to the ECS.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
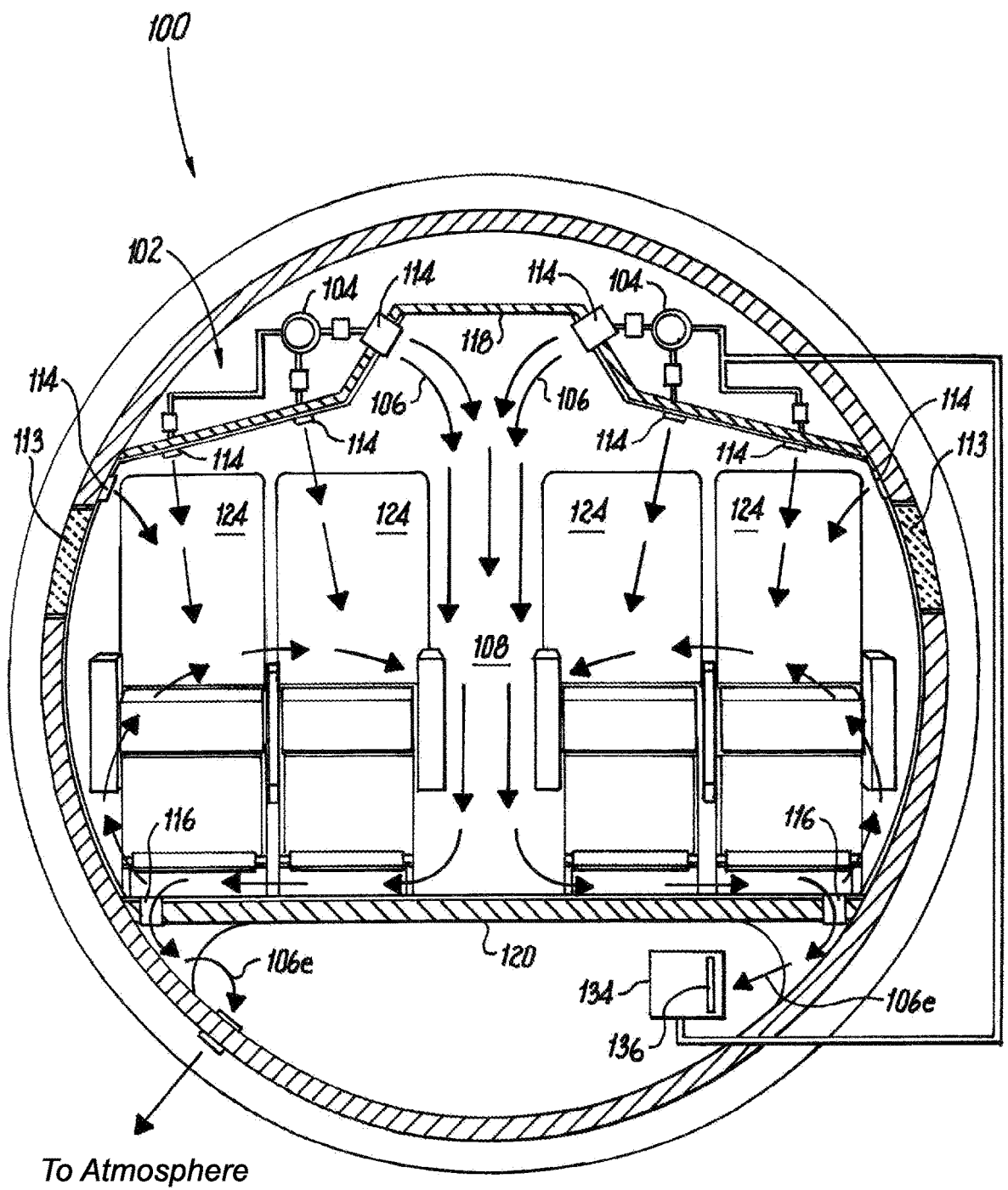
FIG. 1 is a schematic cross-sectional front end elevation view of an embodiment of a system constructed in accordance with the present disclosure, showing air flow patterns in a cabin.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3 will be described. The systems and methods described herein can be used to reduce the spread of contagions aboard aircraft, e.g., using air flows from the environmental control system (ECS).

Aircraft cabins strive to provide equalized pressure amongst all passengers, encouraging vertical air flow from top to bottom in the cabin. To do so, the majority of airflow into the cabin comes from a crown (e.g. on or near the ceiling) and is dispersed throughout the cabin, before being exhausted through an outflow in the floor of the cabin to the cargo bay. The low pressure cabin to cargo outflows create a suction effect to pull the air released from the crown downward, and into the outflow, where the air can then be passed through cabin outflow ducts to a cargo hold. Once in the cargo hold, the air can be exhausted completely (e.g. dumped overboard to the atmosphere via the aircraft outflow valve(s)) or can be recirculated to the cabin after filtration. In certain instances, there may be a need to control the flow of air throughout the cabin (e.g. pandemics, flu season, or the like). For example, it has been shown that airflow patterns in an enclosed space can affect the spread of aerosol pathogens. Therefore, strategically changing airflow patterns within the aircraft cabin can be used to reduce airborne spread of pathogens during flight.

Referring to FIG. 1, the system 100 can include a means for conveying a flow of air into an interior space through a plurality of ducts, such as an environmental control system (ECS) 102. The ECS can have a plurality of ducts 104 configured to convey a flow of air 106 into an interior space (e.g. cabin) 108. The ducts 104 can direct air 106 to the interior space 108 through any suitable means, such as a gasper circuit 110, through the crown 112, or in certain embodiments, through a window duct inlet 114 positioned adjacent a window 113.

Each duct 104 can include an inlet 114 into the interior space 108 and an outflow 116 from the interior space 108, where the inlet 114 is on or near a ceiling 118 of the interior space 108 (e.g. in the crown 112, in the gasper circuit 110, or the window duct 113) and the outflow 116 is positioned on a floor 120 of the interior space 108. Multiple inlets 114 and outflows 116 can be included, for example there may be an inlet 114 and outflow 116 local to each row 122 within the interior space 108. A row 122 can be comprised of any number of passenger service units 124, where a passenger service unit is defined as a volume occupied by a single passenger or passenger seat.

The airflow 106 can be exhausted to atmosphere through an outflow 116, where the airflow 106 can be exhausted (as exhaust flow 106e) to a recirculation module 134 configured to recirculate the airflow 106 to the ECS 102. The exhausted airflow 106e can be passed through an air filter 136 before being recirculated. In certain embodiments, a portion of the airflow 106e can be exhausted to atmosphere, and a portion of the airflow 106e can be exhausted to the recirculation module 134. In certain embodiments, the air filter 136 can include a HEPA filter. In some cases, a small portion of the air that reaches the floor 120 may recirculate within a row 122, before being exhausted. To strategically improve airflow within the interior space 108, and to mitigate such recirculation, systems 200, 300 as provided herein can include any suitable means for directing at least a portion of the flow of air from the plurality of ducts 104 to a single passenger service unit 124, through that passenger unit 124, and to the outflows 116 without recirculation within the row 122 as described herein below.

Figure 2:
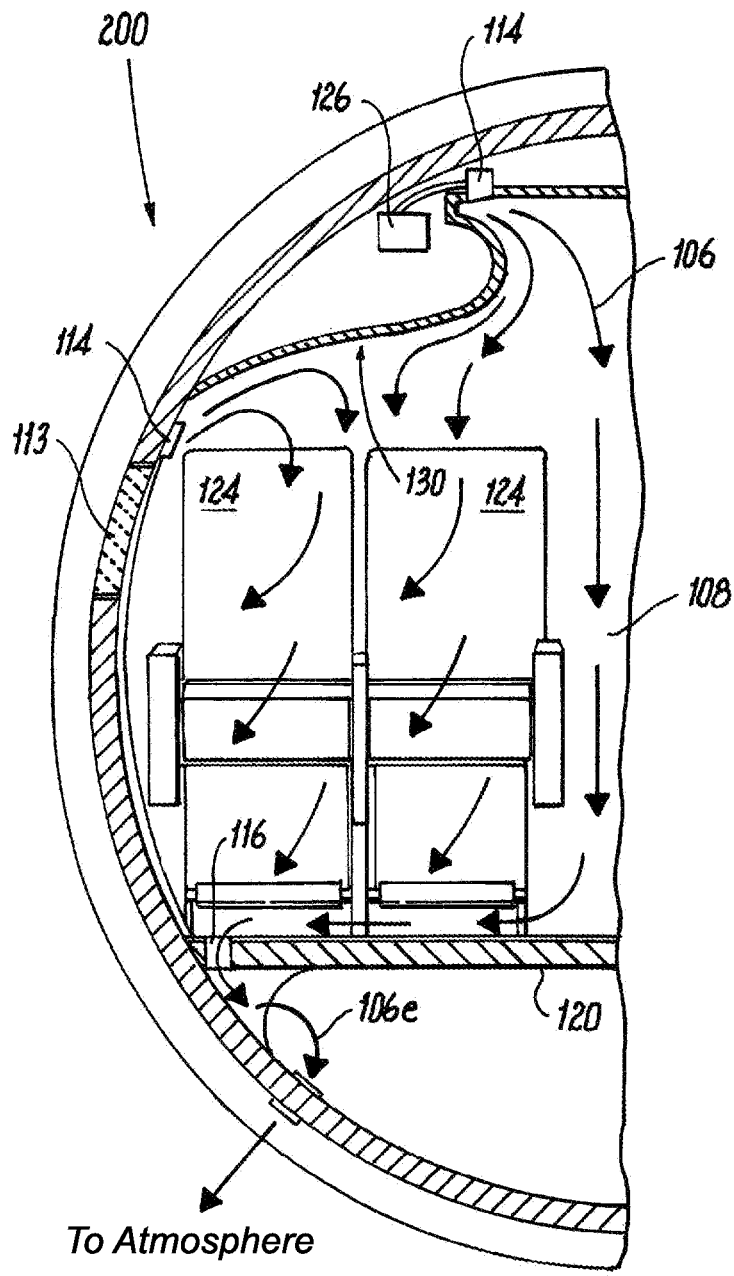
FIG. 2 is a schematic cross-sectional front end elevation view is an embodiment of a means for directing the airflow patterns of FIG. 1.

As shown in FIG. 2, the means for directing a portion of the airflow 106 in system 200 can be or include a diffuser 126 disposed at the inlet 114 of the plurality of ducts 104 where the diffuser 126 can be configured to decelerate the flow of air from inlet 114 so as to prevent a jet. The diffuser 126 can be designed, configured, and adapted according to existing cabin architecture so that the velocity of the air issued therefrom is at or below a maximum velocity to achieve a desired effect for a given overhead bin (e.g. a Coandă effect). An overhead bin 128 can be mounted in the interior space 108 below the plurality of ducts 104 relative to the direction of airflow, such that the airflow 106 is configured to follow and flow along a convex outer surface 130 of the overhead bin 128, under the Coandă effect for example, or any other suitable effect allowing the airflow 106 to "stick" to the outer surface 130 before being directed elsewhere.

A majority of airflow 106 from the ECS 102 can flow from the inlet 114 at a top of the interior space 108, along the overhead bin 128, to the outflow 116 at a bottom of the interior space 108 (e.g., through dado panels in the floor). This can yield a net top-to-bottom airflow 106 without recirculation or redistribution of air between passenger service units 124 prior to exiting through the outflow 116, where at least a portion of the airflow 106 is configured to pass through a single passenger service unit 124 from the overhead bin 128 to the outflow 116. In certain embodiments, the diffuser 126 can be tuned so that the flow of air issued from the window duct 113 and the air issued from the inlet 114 at the ceiling may collide at a collision point, and force resultant air downwards to a passenger service unit 124.

Figure 3:
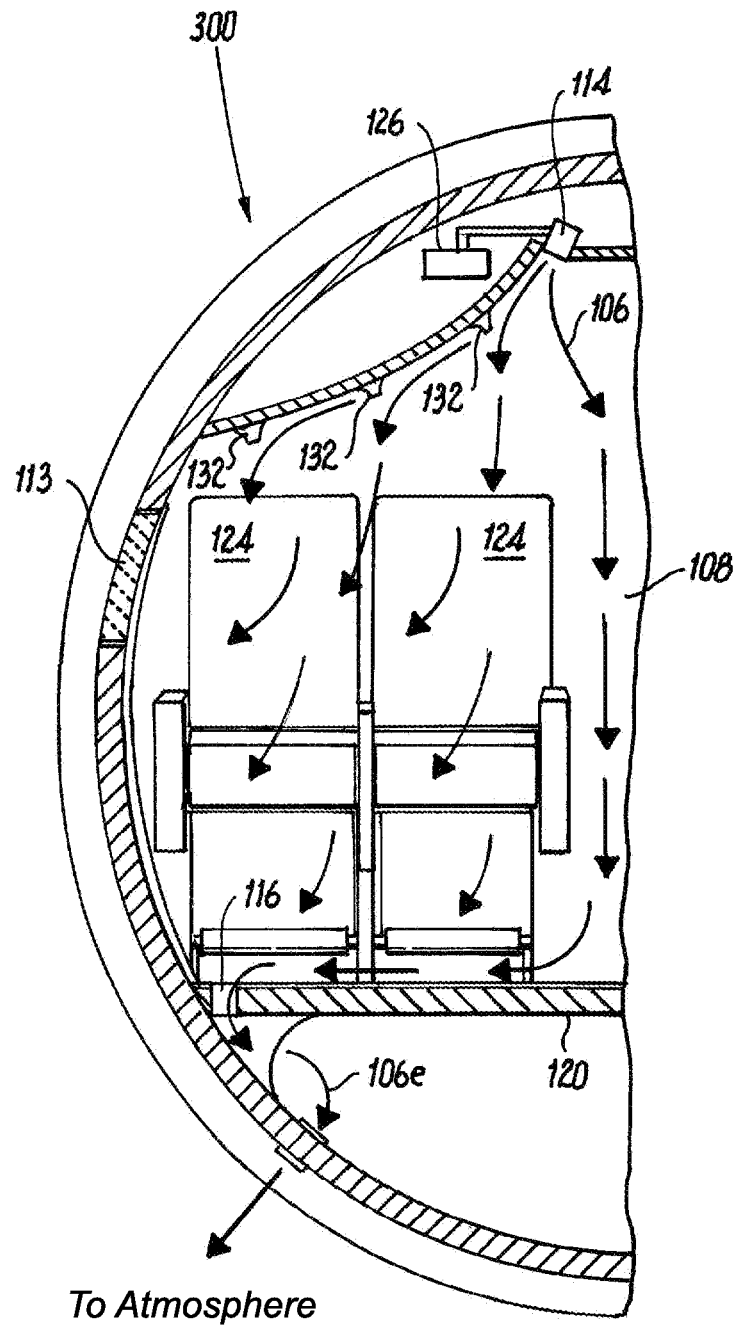
FIG. 3 is a schematic cross-sectional front end elevation view is an embodiment of a means for directing the airflow patterns of FIG. 1.

As shown in FIG. 3, in certain embodiments, the means for directing a portion of the airflow 106 in system 300 can be or include an airflow deflector 132 operatively connected to the overhead bin 128 configured to direct at least a portion of the airflow 106 to a single passenger service unit 124. In this case, all or most of the airflow 106 can be issued from an inlet 114 at the ceiling, without any contribution from a window duct. In certain such embodiments, the airflow deflector 132 can include a plurality of airflow deflectors, where each respective airflow deflector 132 is configured to direct a respective portion of the airflow to the single respective passenger service unit 124. The respective portion of the airflow can flow through the single passenger service unit 124 from the deflection point on the overhead bin 128 to the outflow 116.

In certain embodiments, the airflow deflector 132 can be formed integral with the overhead bin 128, and/or the airflow deflector 132 can be configured to be mounted to an existing overhead bin 128, such as on an adhesive strip that can be retrofitted to an overhead bin 128. The airflow deflector can be or include any suitable deflection means including, but not limited to, any one or combination of a scoop, a bump, and/or a dimple, where the deflector can be included on a strip. As would be appreciated by those having ordinary skill in the art, it is contemplated that systems 200 and 300 can be used independently, or in concert, to achieve the desired airflow pattern for a given environment in a given cabin.

In accordance with at least one aspect of this disclosure, a method can include flowing air into an interior space (e.g. interior 108) through a plurality of ducts of an environmental control system (e.g. ECS 102) at a top of the interior space relative to the direction of airflow, directing a portion of the air flow downward relative to gravity to a single passenger service unit (e.g. unit 124) of a plurality of passenger service units, flowing the air from the interior space through an outflow (e.g. outflow 116) at a bottom of the interior space relative to the direction of airflow, and exhausting the air from the interior space to a recirculation module (e.g. module 134) and/or an ambient environment.

In certain embodiments, directing the air flow can include flowing the air through a diffuser (e.g. diffuser 126) at inlet 114 of the plurality of ducts configured to create a Coandă effect on airflow effused from the plurality of ducts, and flowing at least a portion of the airflow along a convex outer surface of an overhead bin (e.g. bin 128), and downward to the single passenger service unit.

In certain embodiments, directing the air flow can include deflecting the airflow with an airflow deflector (e.g. deflector 132) operatively connected to the overhead bin to direct at least a portion of the airflow to the single passenger service unit. In certain embodiments, exhausting the air from the interior space to the recirculation module further includes, passing the exhausted air through a HEPA filter (e.g. filter 136), and the method can further include recirculating the exhausted air to the ECS.

The methods and systems of the present disclosure, as described above and shown in the drawings, provide for minimizing pathogen transmission in an aircraft cabin by strategically directing airflow in an aircraft cabin. Though the system 100 as described herein is described with respect to an aircraft cabin, the systems and methods can readily apply to any enclosed interior space having an environmental control system, or other suitable HVAC system for air circulation, such as other commercial passenger vehicles or in buildings. Additionally, embodiments aim to utilize existing infrastructure within the aircraft, such as the ECS, ducts, and internal components, so that no disassembly or deconstruction of the aircraft is necessary. Instead, embodiments can limit any modification to cabin interiors, making it possible to retrofit embodiments into existing aircraft.

While the apparatus and methods of the subject disclosure have been shown and described, those skilled in the art will readily appreciate that changes and/or modifications may be made thereto without departing from the scope of the subject disclosure.

What is claimed is:

1. A system comprising:
   an environmental control system (ECS) having a plurality of ducts configured to convey an airflow into an interior space through the plurality of ducts, wherein the airflow results in a net top-to-bottom airflow;
   a plurality of valves disposed in the plurality of ducts to control the airflow through a respective duct into the interior space;
   an overhead bin mounted in the interior space below the plurality of ducts relative to a direction of the airflow; and
   a diffuser disposed at an outlet of the plurality of ducts configured to induce the airflow to flow along a convex outer surface of the overhead bin, wherein the diffuser is configured to induce the airflow to flow along the convex outer surface of the overhead bin under the Coandă effect, wherein each duct includes a first inlet that is positioned on a crown of the interior space and a plurality of second inlets such that at least one of the plurality of second inlets is positioned above each passenger service unit of a plurality of passenger service units, and wherein an outflow is positioned on a floor of the interior space configured to exhaust the airflow.

2. The system as recited in claim 1, wherein each duct includes a third inlet that is positioned on a window of the interior space, wherein a first portion of the airflow from the first inlet or a second portion of the airflow from the plurality of second inlets collides with a third portion of the airflow from the third inlet, wherein in response to the colliding a resultant airflow is directed downward toward a passenger service unit of the plurality of passenger service units, and wherein a second outflow is positioned on the floor of the interior space configured to exhaust the airflow.

3. The system as recited in claim 1, wherein a majority of the airflow from the ECS flows from the first inlet at a top of the interior space, along the overhead bin, to the outflow at a bottom of the interior space.

4. The system as recited in claim 3, wherein the diffuser is configured so that at least a portion of the airflow passes through a single passenger service unit from the overhead bin to the outflow.

5. The system as recited in claim 1, further comprising at least one airflow deflector operatively connected to the overhead bin configured to direct at least a portion of the airflow to a single passenger service unit.

6. The system as recited in claim 5, wherein the at least one airflow deflector includes a plurality of airflow deflectors, wherein each respective airflow deflector is configured to direct a respective portion of the airflow to a single respective passenger service unit.

7. The system as recited in claim 6, wherein the respective portion of the airflow is configured to flow through a single passenger service unit from a deflection point on the overhead bin to the outflow.

8. The system as recited in claim 6, wherein the at least one airflow deflector is formed integral with the overhead bin.

9. The system as recited in claim 6, wherein the at least one airflow deflector is configured to be mounted to an existing overhead bin.

10. The system as recited in claim 6, wherein the at least one airflow deflector is at least one of a scoop, a bump, and/or a dimple.

11. The system as recited in claim 1, wherein the airflow is exhausted to atmosphere through an outflow valve.

12. The system as recited in claim 1, wherein the outflow is exhausted to a recirculation module configured to recirculate the airflow to the ECS, wherein the exhausted airflow is passed through an air filter of the recirculation module before being recirculated.

13. The system as recited in claim 12, wherein the air filter includes a HEPA filter.

14. A system comprising:
   means for conveying a flow of air into an interior space through a plurality of ducts wherein the flow of air results in a net top-to-bottom airflow;
   means for directing at least a portion of the flow of air from the plurality of ducts to a single passenger service unit, wherein the respective portion of the flow of air is configured to flow through the single passenger unit before being exhausted, wherein a diffuser is configured to induce the airflow to flow along a convex outer surface of an overhead bin under the Coandă effect, wherein each duct includes a first inlet that is positioned on a crown of the interior space and a plurality of second inlets such that at least one of the plurality of second inlets is positioned above each passenger service unit of a plurality of passenger service units, and wherein an outflow is positioned on a floor of the interior space configured to exhaust the airflow.

15. A method, comprising:
   flowing air into an interior space through a plurality of ducts of an environmental control system at a top of the interior space relative to the direction of airflow;
   directing the airflow downward relative to gravity to a plurality of passenger service units;
   flowing the air from the interior space through an outflow at a bottom of the interior space relative to the direction of airflow; and
   exhausting the air from the interior space to a recirculation module and/or an ambient environment;
   wherein directing the airflow includes:
      flowing the air through a diffuser at an outlet of the plurality of ducts configured to create a Coanda effect on airflow effused from the plurality of ducts;
      flowing at least a portion of the airflow along a convex outer surface of an overhead bin, and downward to each single passenger service unit; and
      deflecting the airflow with an airflow deflector operatively connected to the overhead bin to direct at least a unique portion of the airflow to each single passenger service unit.

16. The method as recited in claim 15, wherein exhausting the air from the interior space to the recirculation module further includes, passing the exhausted air through a HEPA filter, and further comprising:
   recirculating the exhausted air to the environmental control system.

* * * * *